United States Patent
Seo et al.

(10) Patent No.: US 9,538,514 B2
(45) Date of Patent: Jan. 3, 2017

(54) METHOD FOR RECEIVING DOWNLINK SIGNAL AND METHOD FOR TRANSMITTING SAME, USER EQUIPMENT, AND BASE STATION

(75) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 14/003,408

(22) PCT Filed: Mar. 7, 2012

(86) PCT No.: PCT/KR2012/001650
§ 371 (c)(1),
(2), (4) Date: Sep. 5, 2013

(87) PCT Pub. No.: WO2012/124922
PCT Pub. Date: Sep. 20, 2012

(65) Prior Publication Data
US 2014/0064204 A1    Mar. 6, 2014

Related U.S. Application Data

(60) Provisional application No. 61/451,610, filed on Mar. 11, 2011.

(51) Int. Cl.
*H04W 72/04* (2009.01)
*H04W 84/04* (2009.01)
*H04L 5/00* (2006.01)
*H04B 7/155* (2006.01)

(52) U.S. Cl.
CPC .......... *H04W 72/042* (2013.01); *H04L 5/0035* (2013.01); *H04L 5/0051* (2013.01); *H04L 5/0094* (2013.01); *H04B 7/15542* (2013.01); *H04L 5/0007* (2013.01); *H04W 84/047* (2013.01)

(58) Field of Classification Search
CPC ...... H04L 5/007; H04L 5/0035; H04L 5/0051; H04L 5/0094; H04B 7/15542; H04W 72/042; H04W 84/047
See application file for complete search history.

(56) References Cited

U.S. PATENT DOCUMENTS

| | | |
|---|---|---|
| 2009/0209247 A1 | 8/2009 | Lee et al. |
| 2010/0111043 A1 | 5/2010 | Balasubramanian et al. |
| 2010/0265870 A1 | 10/2010 | Cai et al. |
| 2010/0296463 A1 | 11/2010 | Taoka et al. |
| 2010/0303013 A1 | 12/2010 | Khandekar et al. |
| 2011/0090808 A1* | 4/2011 | Chen et al. ............ 370/252 |
| 2011/0194412 A1 | 8/2011 | Park et al. |

(Continued)

FOREIGN PATENT DOCUMENTS

| | | |
|---|---|---|
| CN | 101909305 A | 12/2010 |
| KR | 10-2009-0089770 A | 8/2009 |

(Continued)

*Primary Examiner* — Jianye Wu
(74) *Attorney, Agent, or Firm* — Birch, Stewart, Kolasch & Birch, LLP

(57) ABSTRACT

Presented is a plan for utilizing resources not being used in a subframe consisting of relay transmission, and being thrown away thereafter. The present invention enables efficient utilization of the resources by reducing the waste of the resources in a wireless communication system supporting a relay.

14 Claims, 9 Drawing Sheets

(56) References Cited

U.S. PATENT DOCUMENTS

| | | |
|---|---|---|
| 2012/0063386 A1 | 3/2012 | Park et al. |
| 2012/0078933 A1 | 3/2012 | Kim et al. |
| 2012/0176884 A1* | 7/2012 | Zhang et al. ............... 370/203 |
| 2013/0336197 A1 | 12/2013 | Park et al. |

FOREIGN PATENT DOCUMENTS

| | | |
|---|---|---|
| KR | 10-2010-0121434 A | 11/2010 |
| KR | 10-2010-0123649 A | 11/2010 |
| WO | 2009/044884 A1 | 4/2009 |
| WO | WO 2010/039003 A2 | 4/2010 |
| WO | WO 2010/128816 A2 | 11/2010 |
| WO | WO 2011095062 A1 * | 8/2011 |
| WO | WO 2011/140139 A1 | 11/2011 |

* cited by examiner

METHOD FOR RECEIVING DOWNLINK SIGNAL AND METHOD FOR TRANSMITTING SAME, USER EQUIPMENT, AND BASE STATION

This application is the National Phase of PCT/KR2012/001650 filed on Mar. 7, 2012, which claims priority under 35 U.S.C. 119(e) to U.S. Provisional Application No. 61/451,610 filed on Mar. 11, 2011, all of which are hereby expressly incorporated by reference into the present application.

TECHNICAL FIELD

The present invention relates to a wireless communication system and, more particularly, to a method for transmitting/receiving a downlink signal and an apparatus therefor.

BACKGROUND ART

In a general wireless communication system, since signals are transmitted and received through a direct link between a base station (BS) and a user equipment (UE), a radio communication link having high reliability may be easily configured between the BS and the UE. However, the wireless communication system has low flexibility in a radio network configuration because the location of the BS may be fixed. In addition, in wireless environments in which traffic distribution or variation in the amount of call demands is wide, it is difficult to provide an efficient communication service. To overcome such shortcoming, a data transfer scheme of a multi-hop relay form using fixed relays, mobile relays, or general UEs may be applied to a general wireless communication system.

A wireless communication system using a multi-hop relay scheme may reconfigure a network by rapidly coping with a communication environment variation and may efficiently manage all wireless networks. For example, the wireless communication system using the multi-hop relay scheme may extend cell service area and increase system capacity. That is, when a channel state between the BS and the UE is poor, a relay may be installed between the BS and the UE to configure a multi-hop relay path through the relay, thereby providing the UE with a radio channel having an excellent channel state.

In addition, a higher data channel speed may be provided by using the multi-hop relay scheme in a cell edge area having a poor channel state from the BS and a cell service area can be extended.

Thus, the relay is widely being used as a technique introduced to eliminate an electromagnetic waveform shadow zone. The relay was restricted to a repeater function in the past to simply amplify and transmit signals, whereas the relay has recently evolved into a more intelligent type.

Furthermore, the relay technique is a technology required to reduce BS installation costs and backhaul network maintenance costs in a next-generation mobile communication system and simultaneously to improve service coverage area and data throughput. As the relay technique has gradually developed, a new wireless communication system needs to support relays used in a conventional wireless communication system.

DISCLOSURE

Technical Problem

The present invention provides a method for efficiently using resources in a wireless communication system supporting a relay and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for receiving a downlink signal at a user equipment in a wireless communication system, including receiving downlink control information from a base station in a prescribed number of symbols in a subframe, receiving downlink data from the base station in the subframe according to the downlink control information, and receiving information indicating a specific subframe and information indicating available symbols in the specific subframe from the base station, wherein the downlink data is received in symbols corresponding to the available symbols among a plurality of symbols of the subframe when the subframe corresponds to the specific subframe.

In another aspect of the present invention, provided herein is a method for transmitting a downlink signal at a base station in a wireless communication system, including transmitting downlink control information to a user equipment in a prescribed number of symbols in a subframe, transmitting downlink data to the user equipment in the subframe according to the downlink control information, and transmitting information indicating a specific subframe and information indicating available symbols in the specific subframe to the user equipment, wherein the downlink data is transmitted in symbols corresponding to the available symbols among a plurality of symbols of the subframe to the user equipment when the subframe corresponds to the specific subframe.

In another aspect of the present invention, provided herein is a user equipment for receiving a downlink signal in a wireless communication system, including a radio frequency (RF) unit, and a processor configured to control the RF unit to receive downlink control information from a base station in a prescribed number of symbols in a subframe and control the RF unit to receive downlink data from the base station in the subframe according to the downlink control information, wherein the processor controls the RF unit to receive information indicating a specific subframe and information indicating available symbols in the specific subframe from the base station and controls the RF unit to receive the downlink data in symbols corresponding to the available symbols among a plurality of symbols of the subframe when the subframe corresponds to the specific subframe.

In another aspect of the present invention, provided herein is a base station for transmitting a downlink signal in a wireless communication system, including a radio frequency (RF) unit, and a processor configured to control the RF unit to transmit downlink control information to a user equipment in a prescribed number of symbols in a subframe and control the RF unit to transmit downlink data to the user equipment in the subframe according to the downlink control information, wherein the processor controls the RF unit to transmit information indicating a specific subframe and information indicating available symbols in the specific subframe to the user equipment and controls the RF unit to transmit the downlink data to the user equipment in symbols corresponding to the available symbols among a plurality of symbols of the subframe when the subframe corresponds to the specific subframe.

In each aspect of the present invention, the downlink data may be transmitted in symbols other than the prescribed number of symbols among the plurality of symbols of the subframe when the subframe is not the specific subframe.

In each aspect of the present invention, a demodulation reference signal for the downlink data may be transmitted in the subframe, wherein the demodulation reference signal may be transmitted using a scrambling ID for the user equipment or may be transmitted in a second slot of first and second slots constituting the subframe, when the subframe corresponds to the specific subframe.

In each aspect of the present invention, a transport block size corresponding to the downlink data may be determined using the number of physical resource blocks, $N_{PRB}$, determined by the following equation, when the subframe corresponds to the specific subframe: <Equation>$N_{PRB}$=max {floor($N'_{PRB}$*(k/$N_{sym}$),1}, where $N'_{PRB}$ is the number of physical resource blocks allocated to the user equipment, $N_{sym}$ is the number of symbols other than the prescribed number of symbols in the subframe, and k is the number of the available symbols.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, resources can be efficiently used by reducing waste of the resources in a wireless communication system supporting a relay.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
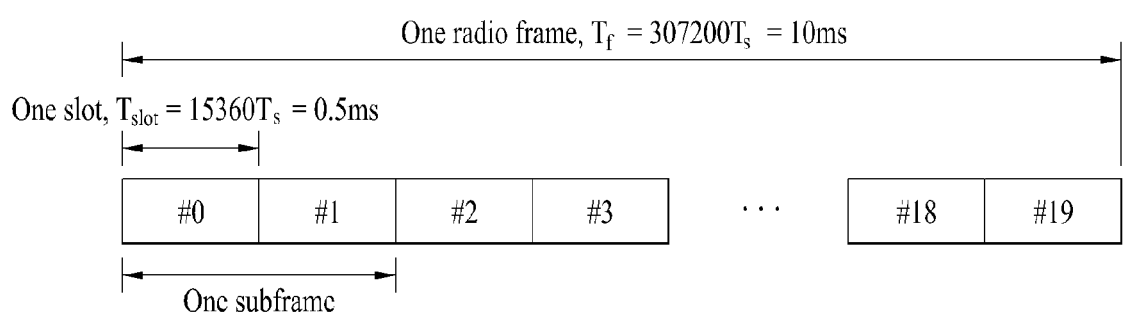
FIG. 1 is a view illustrating an exemplary structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a Node-B (NB), an evolved-NodeB (eNB), a base transceiver system (BTS), an access point (AP), or a processing server (PS). Moreover, in the present invention, a relay refers to a device and/or a point for extending a service area of a BS and providing a smooth service of the BS in a shadow area. The relay may be referred to as a relay node (RN) or a relay station (RS). In terms of a UE, the relay is a portion of a radio access network and operates like a BS except in some cases. A BS that transmits signals to the relay or receives signals from the relay is called a donor BS. The relay is connected to the donor BS wirelessly. In terms of the BS, the relay operates like the UE except in some cases (e.g. the case in which downlink control information is transmitted through an R-PDCCH, not through a PDCCH). Accordingly, the relay includes both a physical layer entity used for communication with the UE and a physical layer entity used for communication with the donor entity. Transmission from the BS to the relay, hereinafter referred to as BS-to-RN transmission, occurs in a downlink subframe and transmission from the relay to the BS, hereinafter referred to as RN-to-BS transmission, occurs in an uplink subframe. Meanwhile, BS-to-RN transmission and RN-to-BS transmission occur in a downlink frequency band and RN-to-BS transmission and UE-to-RN transmission occur in an uplink frequency band. In the present invention, the relay or UE may communicate with a network to which one or more BSs belong through the one or more BSs.

In the present invention, a physical downlink control channel (PDCCH), a physical control format indicator channel (PCFICH), a physical hybrid automatic retransmit request indicator channel (PHICH), and a physical downlink shared channel (PDSCH) may indicate a set of time-frequency resources or resource elements (REs) carrying downlink control information (DCI), a control format indicator (CFI), downlink acknowledgement (ACK)/negative ACK (HACK), and downlink data, respectively. In the present invention, a time-frequency resource or resource element (RE) that is assigned to or pertains to PDCCH/

PCFICH/PHICH/PDSCH is referred to as a PDCCH/PCFICH/PHICH/PDSCH RE or a PDCCH/PCFICH/PHICH/PDSCH resource. Therefore, in the present invention, PDCCH/PCFICH/PHICH/PDSCH transmission by a BS may be identically interpreted as downlink data/control information transmission on PDCCH/PCFICH/PHICH/PDSCH, respectively.

In addition, in the present invention, a cell-specific reference signal (CRS)/demodulation reference signal (DMRS)/channel state information reference signal (CSI-RS) time-frequency resource (or RE) indicates an RE that is allocated to or available to CSR/DMRS/CSI-RS or a time-frequency resource (or RE) carrying a CRS/DMRS/CSI-RS. A subcarrier including a CRS/DMRS/CSI-RS RE is referred to as a CRS/DMRS/CSI-RS subcarrier and an orthogonal frequency division multiplexing (OFDM) symbol including the CRS/DMRS/CSI-RS RE is referred to as a CRS/DMRS/CSI-RS symbol.

FIG. 1 illustrates an exemplary structure of a radio frame used in a wireless communication system. Specifically, FIG. 1 illustrates the structure of a radio frame according to 3GPP LTE(-A). The structure of the frame of FIG. 1 may be applied to frequency division duplex (FDD) mode, half FDD (H-FDD) mode, and time division duplex (TDD) mode.

Referring to FIG. 1, a 3GPP LTE(-A) radio frame is 10 ms (307200$T_s$) in duration. The radio frame is divided into 10 subframes of equal size. Subframe numbers may be assigned to the 10 subframes within one radio frame, respectively. $T_s$ denotes sampling time, where $T_s=1/(2048\times15\ kHz)$. Each subframe is 1 ms long and is further divided into two slots. 20 slots are sequentially numbered from 0 to 19 per radio frame. Duration of each slot is 0.5 ms. A time interval in which one subframe is transmitted is defined as a transmission time interval (TTI). Time resources may be distinguished by radio frame numbers (or radio frame indexes), subframe numbers (or subframe indexes), slot numbers (or slot indexes), and the like.

The radio frame may have different configurations according to duplex mode. In FDD mode for example, since downlink transmission and uplink transmission are discriminated according to frequency, a radio frame includes either downlink subframes or uplink subframes.

On the other hand, in TDD mode, since downlink transmission and uplink transmission are discriminated according to time, the frame includes both the downlink subframes and the uplink subframes.

Figure 2:
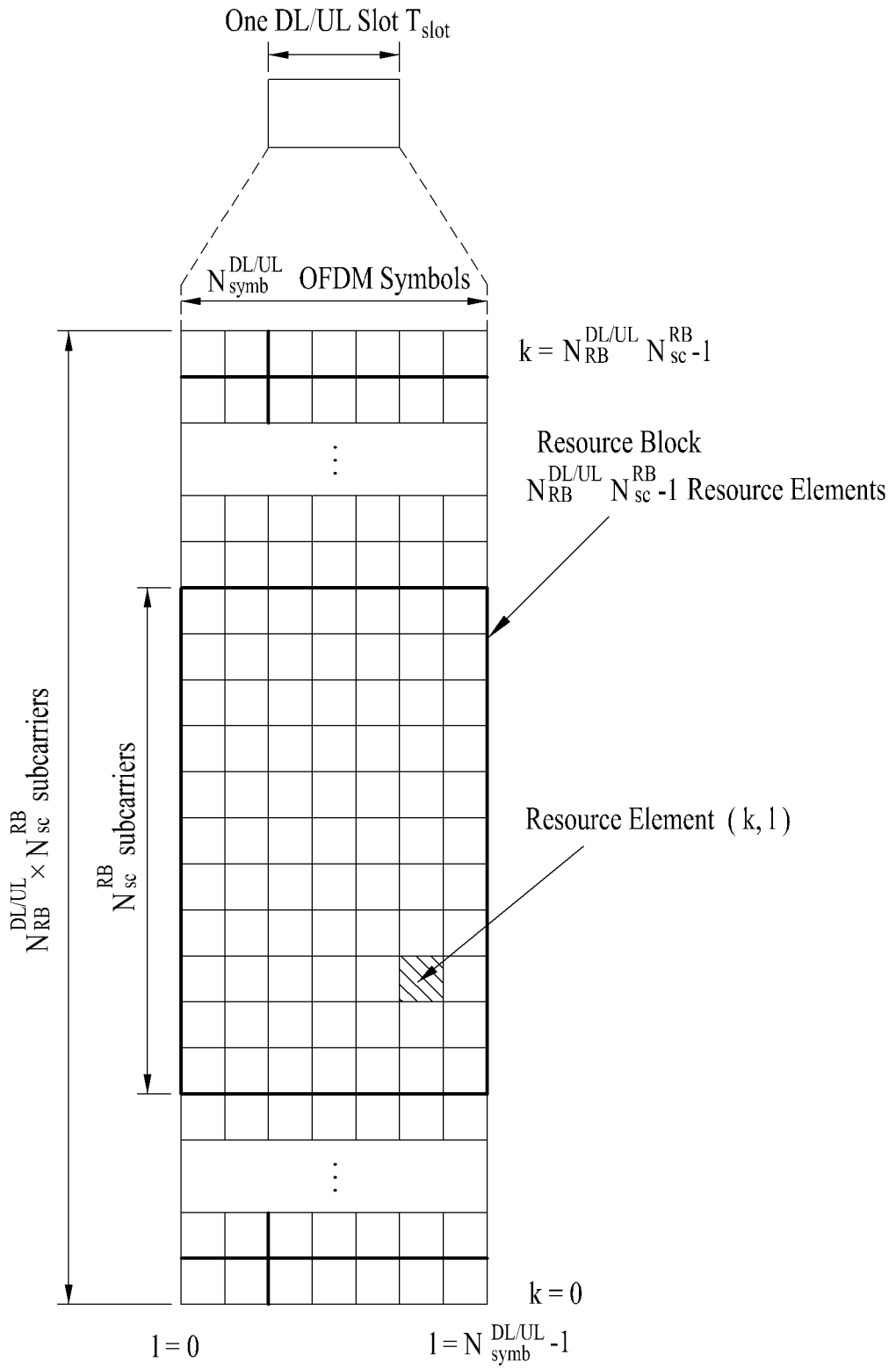
FIG. 2 illustrates an exemplary structure of a DL/UL slot in a wireless communication system.

FIG. 2 illustrates an exemplary structure of a downlink (DL)/uplink (UL) slot in a wireless communication system. Specifically, FIG. 2 illustrates the structure of a resource grid in a 3GPP LTE(-A) system. One resource grid is present per antenna port.

Referring to FIG. 2, a slot includes a plurality of OFDM symbols in the time domain and a plurality of resource blocks (RBs) in the frequency domain. An OFDM symbol may indicate one symbol duration. An RB includes a plurality of subcarriers in the frequency domain. An OFDM symbol may also be called an OFDM symbol or a single-carrier frequency division multiplex (SC-FDM) symbol etc. according to a multiple access scheme. The number of OFDM symbols per slot may vary depending on channel bandwidth and cyclic prefix (CP) length. For instance, one slot includes 7 OFDM symbols in case of a normal CP, whereas one slot includes 6 OFDM symbols in case of an extended CP. While a subframe is shown in FIG. 2 as having a slot with 7 OFDM symbols for convenience of description, embodiments of the present invention are also applicable to subframes with any other number of OFDM symbols. A resource including one OFDM symbol and one subcarrier is referred to as an RE or a tone.

Referring to FIG. 2, a signal transmitted in each slot may be expressed by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on DL transmission bandwidth and UL transmission bandwidth, respectively. Each OFDM symbol includes $N^{DL/UL}_{RB}N^{RB}_{sc}$ subcarriers in the frequency domain. The number of subcarriers per carrier is determined by Fast Fourier Transform (FFT) size. Subcarriers may be divided into data subcarriers for data transmission, reference signal subcarriers for reference signal transmission, and null subcarriers for a guard band and a Direct Current (DC) component. The null subcarriers for the DC component are remaining unused subcarriers and are mapped to a carrier frequency $f_0$ in an OFDM signal generation process. The carrier frequency is also referred to as a center frequency. $N^{DL}_{symb}$ represents the number of OFDM or SC-FDM symbols in the DL slot and $N^{UL}_{symb}$ represents the number of OFDM or SC-FDM symbols in the UL slot. $N^{RB}_{sc}$ represents the number of subcarriers in one RB.

In other words, a physical resource block (PRB) is defined as $N^{DL/UL}_{symb}$ (e.g. 7) consecutive OFDM symbols or SC-FDM symbols in the time domain and $N^{RB}_{sc}$ (e.g. 12) consecutive subcarriers in the frequency domain. Therefore, one PRB includes $N^{DL/UL}_{symb}\times N^{RB}_{sc}$ REs. In one subframe, two RBs, each located in one of two slots of the subframe, while occupying the same $N^{RB}_{sc}$ consecutive subcarriers are referred to as a PRB pair. Therefore, two RBs constituting the PRB pair have the same PRB index.

Each RE in the resource grid may be uniquely defined by an index pair (k,l) in a slot. k is a frequency-domain index ranging from 0 to $N^{DL/UL}_{RB}N^{RB}_{sc}-1$ and l is a time-domain index ranging from 0 to $N^{DL/UL}_{symb}-1$.

Figure 3:
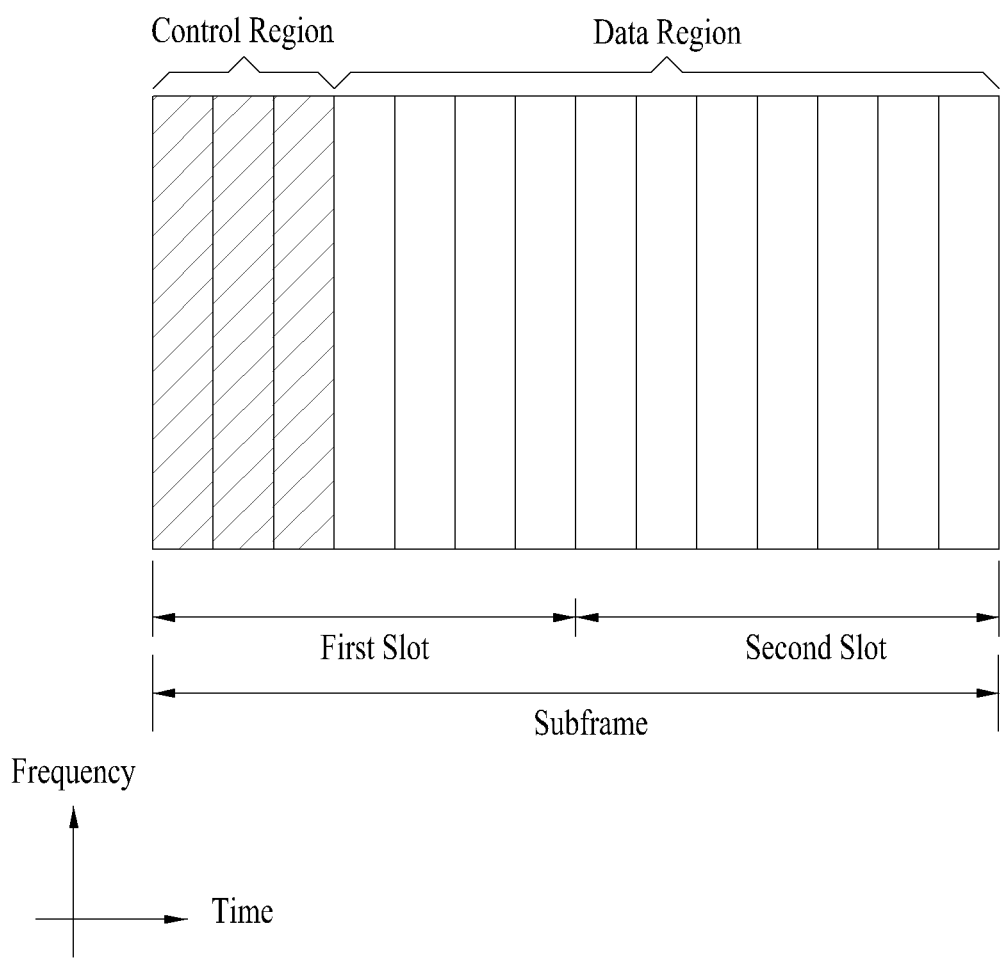
FIG. 3 illustrates an exemplary structure of a DL subframe used in a 3GPP LTE(-A) system.

FIG. 3 illustrates an exemplary structure of a DL subframe used in a 3GPP LTE(-A) system.

Referring to FIG. 3, a DL subframe may be divided into a control region and a data region. The control region includes one or more OFDM symbols starting from the first OFDM symbol. In the DL subframe of the 3GPP LTE(-A) system, the control region is configured as a region in which a PDCCH can be transmitted. Accordingly, the control region in the DL subframe is also referred to as a PDCCH region. The number of OFDM symbols used for the control region in the DL a subframe may be independently configured on a subframe basis and signaled through a PCFICH. A BS may transmit control information to UE(s) in the control region. To transmit control information, a PDCCH, a PCFICH, a PHICH, etc. may be allocated to the control region.

The BS may transmit information related to resource assignment of a paging channel (PCH) and a DL shared channel (DL-SCH) that are transport channels, a UL scheduling grant, HARQ information, a downlink assignment index (DAI), a transmit power control (TPC) command, etc. to each UE or UE group on a PDCCH. Information related to resource assignment carried by the PDCCH may include RB assignment information, i.e. frequency resource information, used for UL/DL transmission of a corresponding UE. The BS may allocate frequency resources for the UE through the PDCCH.

The BS may transmit data to a UE or UE group in the data region. Data transmitted in the data region may be referred to as user data. A PDSCH may be allocated to the data region for user data transmission. A paging channel (PCH) and a downlink shared channel (DL-SCH) are transmitted on the PDSCH. A UE may decode control information received on a PDCCH and thus read data received on the PDSCH. The size and usage of downlink control information (DCI) transmitted on a PDCCH may vary according to a PDCCH format and the size of the DCI may vary according to coding rate. Information indicating to which UE or UE group PDSCH data is transmitted and information indicating how the UE or UE group should receive and decode PDSCH data are transmitted on the PDCCH. For example, it is assumed that a specific PDCCH is CRC-masked with a Radio Network Temporary Identity (RNTI) 'A' and information about data transmitted using a radio resource 'B' (e.g. frequency location) and using transport format information 'C' (e.g. transmission block size, modulation scheme, coding information, etc.) is transmitted through a specific DL subframe. Then, the UE in a corresponding cell monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. The UE may monitor the plurality of PDCCHs and thus detect a PDCCH thereof. Basically, since the UE is not aware of a position at which the PDCCH thereof is transmitted, the UE performs blind detection (or blind decoding) upon all PDCCHs with a corresponding DCI format in every subframe until a PDCCH having an identifier (ID) thereof is received.

Figure 4:
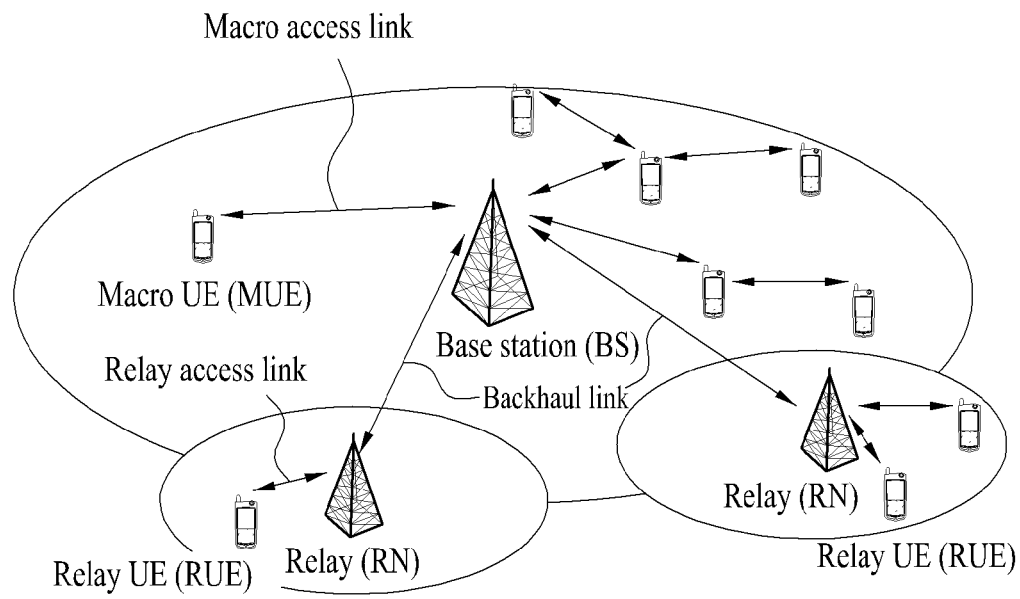
FIG. 4 illustrates a communication system including a relay (or relay node (RN)).

FIG. 4 illustrates a communication system including a relay (or relay node (RN)).

An RN extends the service area of a BS or is installed in a shadow area to provide a smooth service. Referring to FIG. 4, a wireless communication system includes a BS, RNs, and UEs. The UEs communicate with the BS or the RNs. For convenience, a UE communicating with a BS is referred to as a macro UE (MUE) and a UE communicating with an RN is referred to as an RN UE (RUE). A communication link between a BS and an MUE UE and a communication link between an RN and an RUE are referred to as a macro access link and an RN access link, respectively. A communication link between a BS and an RN is referred to as a backhaul link.

RNs may be classified into layer-1 (L1) RNs, layer-2 (L2) RNs, and layer-3 (L3) RNs according to functions thereof in multi-hop transmission. Characteristics of each RN will be briefly described hereinbelow. An L1 RN usually functions as a repeater. The L1 RN simply amplifies a signal received from a BS/UE and transmits the amplified signal to the UE/BS. Because the RN does not perform decoding, transmission delay of the signal is short. Despite this benefit, noise is also amplified because the L1 RN cannot separate signals from noise. To overcome this shortcoming, an advanced repeater or smart repeater having a UL power control or self-interference cancellation function may be used. Operation of an L2 RN may be described as decode-and-forward. The L2 RN can transmit user-plane traffic to L2. While it is advantageous that the L2 RN does not amplify noise, it is disadvantageous that decoding increases transmission delay. An L3 RN is depicted as self-backhauling and may transmit an Internet Protocol (IP) packet to L3. The L3 RN has a radio resource control (RRC) function and, thus, serves as a small-size BS.

The L1 and L2 RNs may be regarded as a portion of a donor cell covered by a BS. If an RN is a part of a donor cell, the RN does not have its own cell identity (ID) because it cannot control its cell and UEs of the cell. However, the RN may still have an ID thereof, i.e. an RN ID. In this case, some functions of radio resource management (RRM) may be controlled by the BS of the donor cell and parts of the RRM may be located in the RN. The L3 RN may control a cell thereof. Then the L3 RN may manage one or more cells and each of the cells managed by the RN may have a unique physical-layer cell ID. The L3 RN may have the same RRM mechanism as a BS. From the perspective of a UE, there is no difference between accessing a cell managed by the RN and accessing a cell managed by a normal BS.

In addition, RNs are classified as follows according to mobility.
  Fixed RN: this type of RN is permanently fixed for use in a shadow area or for coverage extension. It may function as a simple repeater.
  Nomadic RN: this type of RN is temporarily installed when users rapidly increase in number, or is movable within a building.
  Mobile RN: this type of RN may be installed in public transport such as a bus or the subway. The mobility of the RN should be supported.

The following classifications can also be considered according to the link between an RN and a network.
  In-band connection: a network-to-RN link shares the same frequency band with a network-to-UE link in a donor cell.
  Out-band connection: a network-to-RN link and a network-to-UE link use different frequency bands in a donor cell.

Depending on whether a UE is aware of the existence of an RN, RNs may be classified as follows.
  Transparent RN: a UE is not aware of whether or not communication with a network is performed via the RN.
  Non-transparent RN: a UE is aware of whether or not communication with a network is performed via the RN.

Figure 5:
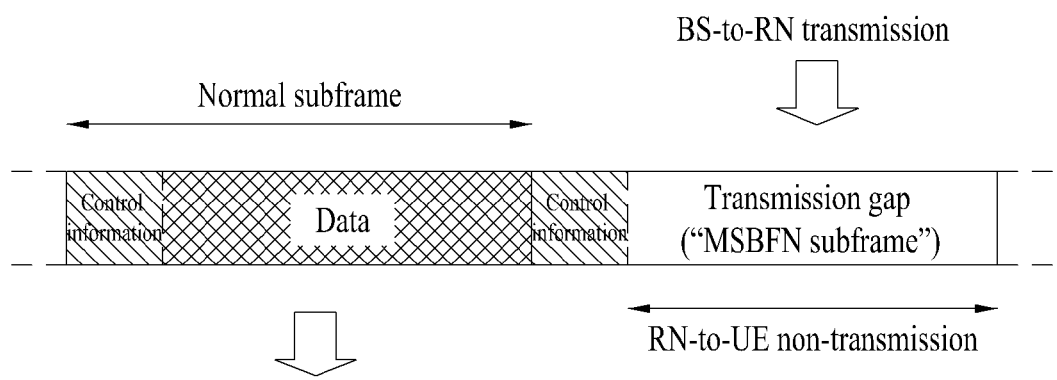
FIG. 5 illustrates exemplary backhaul transmission using a specific subframe.

FIG. 5 illustrates exemplary backhaul transmission using a specific subframe. Specifically, FIG. 5 illustrates RN-to-UE communication using a normal subframe and BS-to-RN communication using a multimedia broadcast over single frequency network (MBSFN) subframe.

In in-band relaying mode, a BS-to-RN link (i.e. a backhaul link) operates in the same frequency band as an RN-to-UE link (i.e. an RN access link). In the case in which an RN transmits a signal to a UE while receiving a signal from a BS or vice versa, the transmitter and receiver of the RN interfere with each other. Accordingly, simultaneous transmission and reception of the RN may be limited. To solve the interference problem, the RN may be configured not to perform communication with UEs in a time duration during which the RN receives data from the BS. The above time duration, i.e. a transmission gap, during which UEs do not expect any RN transmission, may be generated by configuring an MBSFN subframe. That is, the RN or BS configures a subframe as the MBSFN subframe and establishes a backhaul link in the MBSFN subframe (a fake MBSFN method). If a subframe is signaled as the MBSFN subframe, a UE detects a DL signal only in a control region of the subframe and thus the RN may establish the backhaul link using a data region of the subframe. An RN may receive a signal from a BS in a specific subframe (e.g. MBSFN subframe) and transmit data received from the BS to an RUE in another subframe. In this process, the RN performs transmission/reception switching on the same frequency and, thus, the case in which a specific symbol cannot be used may occur. In consideration of such a situation, according to definition in standard (TS 36.216) for a 3GPP LTE(-A) RN, a UE may be informed of a start symbol and end symbol constituting a backhaul link in each slot in a subframe through higher layer signaling or the UE may configure the start symbol and end symbol according to a frame synchronization situation. The following Table 1 and Table 2 show the start symbol and end symbol for the backhaul link. Specifically, Table 1 shows OFDM symbols for BS-to-RN transmission in the first slot in a subframe having a subcarrier spacing of ☐f=15 kHz and a normal CP and Table 2 shows OFDM symbols for BS-to-RN transmission in the second slot in a subframe having a subcarrier spacing of ☐f=15 kHz and a normal CP.

TABLE 1

| Configuration | DL-Start Symbol | End symbol index |
|---|---|---|
| 0 | 1 | 6 |
| 1 | 2 | 6 |
| 2 | 3 | 6 |

TABLE 2

| Configuration | Start symbol index | End symbol index |
|---|---|---|
| 0 | 0 | 6 |
| 1 | 0 | 5 |

Using Table 1 and Table 2, subsets of OFDM symbols available for BS-to-RN transmission among a plurality of OFDM symbols in a subframe may be defined.

Figure 6:
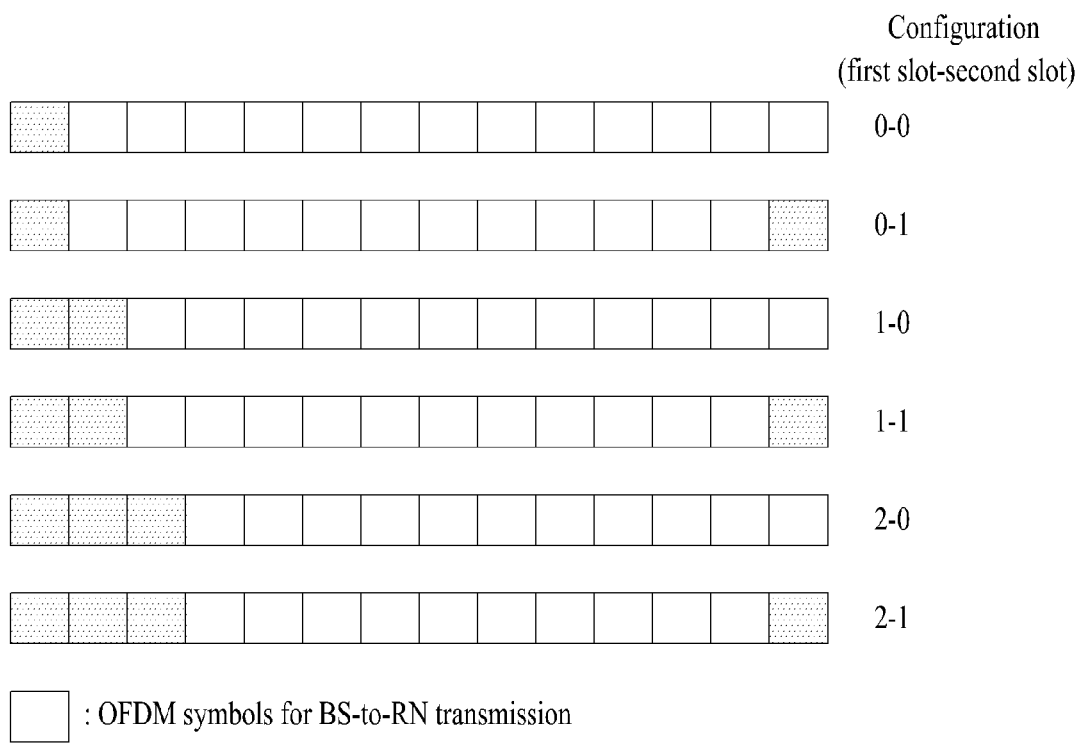
FIG. 6 illustrates OFDM symbol subsets for BS-to-RN transmission in a subframe having a normal CP.

FIG. 6 illustrates OFDM symbol subsets for BS-to-RN transmission in a subframe having a normal CP. In FIG. 6, x-y indicates an OFDM symbol subset for BS-to-RN transmission when a configuration index in the first slot of the subframe is x and a configuration index in the second slot of the subframe is y. Hereinbelow, the configuration x-y will be referred to as a symbol configuration for RN transmission or a symbol configuration for BS-to-RN transmission. For reference, according to the current 3GPP LTE(-A) 36.216 standard, a simultaneous operation of configuration 0 of Table 1 and configuration 0 of Table 2 is not supported.

Referring to FIG. 6, shaded symbols cannot be used for BS-to-RN transmission. Symbols that are not used for BS-to-RN transmission may be equal to symbols of a PDCCH region for BS-to-MUE transmission but may not be equal. Because the OFDM symbols for BS-to-RN transmission are configured by higher layer signaling, it is difficult for OFDM symbol(s) that is not used for BS-to-RN transmission to be completely synchronized with OFDM symbol(s) of a PDCCH region for an MUE. In addition, because it consumes some time for an RN to switch a radio frequency (RF) unit from transmission (Tx) to reception (Rx) or from Rx to Tx, there is a high probability that the number of OFDM symbols that are not used for BS-to-RN transmission is greater than the number of OFDM symbols for the PDCCH region. In this case, among symbols that are used for BS-to-RN transmission, symbols that are not used for BS-to-MUE PDCCH transmission are wasted. For example, if configuration 2-1 of FIG. 6 is used for BS-to-RN transmission and if the number of symbols for BS-to-MUE PDCCH transmission is 1, then three OFDM symbols are wasted. In the case in which a great number of OFDM symbols is not used for BS-to-MUE transmission and BS-to-RN transmission and a broad frequency region is used for BS-to-RN transmission, waste of resources may significantly increase.

For convenience of description, OFDM symbols not used for BS-to-MUE PDCCH transmission, among OFDM symbols that cannot be used for BS-to-RN transmission, will be referred to as residual OFDM symbols hereinbelow. The present invention proposes a method for allowing an MUE to use residual OFDM symbols that cannot be used by an RN.

Figure 7:
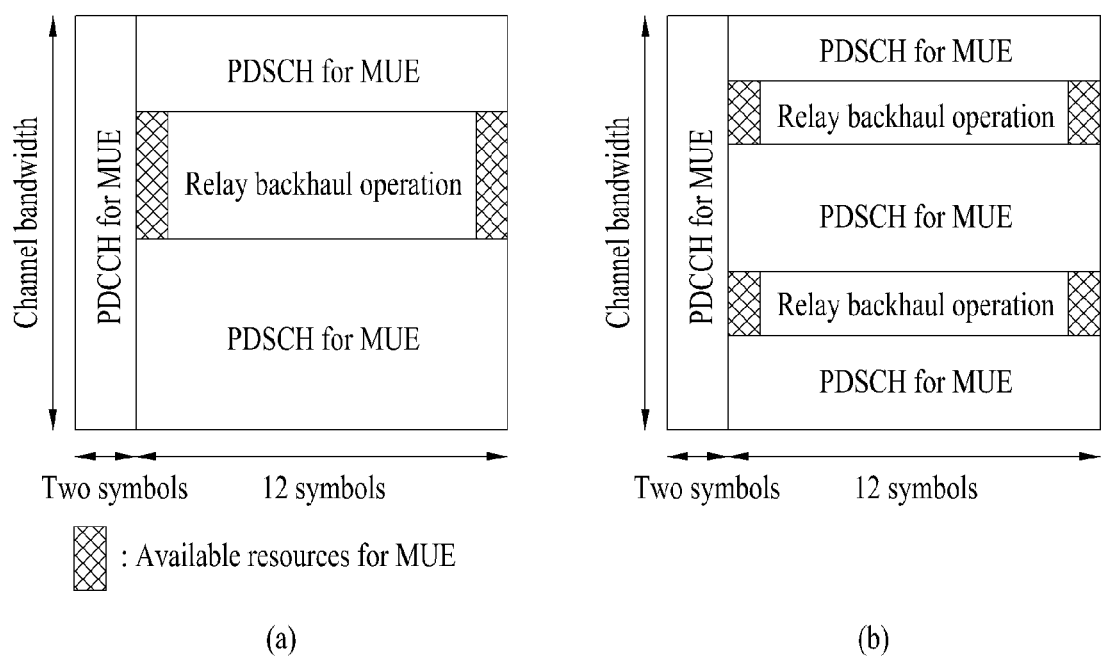
FIG. 7 illustrates exemplary resource allocation in a subframe in which BS-to-RN transmission is performed according to an embodiment of the present invention.

FIG. 7 illustrates exemplary resource allocation in a subframe in which BS-to-RN transmission is performed according to an embodiment of the present invention. Specifically, in the example illustrated in FIG. 7, a PDCCH for an MUE is transmitted in two OFDM symbols, and a symbol configuration for BS-to-RN transmission signaled to an RN or an RUE is configuration 2-1.

Referring to FIG. 7, a total of two symbols, one symbol in each of both ends of resources used for an RN operation, may be used for PDSCH transmission for the MUE. For smooth transmission of a PDSCH using such residual OFDM symbols, the following embodiments are proposed.

<Frequency Band Restriction for MUE Transmission>

If an MUE is assigned a DL resource in a frequency region in which a relaying operation is performed, DL signal reception and processing procedures become complicated, thereby complicating a receiver configuration of the MUE. Accordingly, in an embodiment of the present invention, residual OFDM symbols are allocated to only a specific MUE or specific MUE group, and resources are allocated to the specific MUE or specific MUE group in only a frequency region in which the relaying operation is performed. Then, the specific MUE or MUE group detects PDSCH transmission on only the frequency region on which the relaying operation is performed in the residual OFDM symbols.

Therefore, if a BS according to the present invention allocates residual OFDM symbols to a specific UE, the BS transmits, in a normal subframe, a DL signal to the specific UE over all OFDM symbol resources of a frequency range allocated to the specific UE and transmits, in a subframe in which relay backhaul transmission is performed, a DL control signal to the specific UE using symbol(s) in a PDCCH region. However, in this case, among symbols in a PDSCH region, the BS transmits a DL data signal to the specific UE using only the residual OFDM symbols. The specific UE receives, in the normal subframe, the DL signal using all resources of the allocated frequency range and receives, in the subframe in which relay backhaul transmission is performed, the DL data signal using only the residual OFDM symbols.

<Signaling Indicating Subframe Configuration>

A UE of the present invention may be aware of OFDM symbols used for PDSCH transmission using a PCFICH. Accordingly, the UE according to the present invention may detect a PDCCH thereof and discern frequency resources allocated thereto using resource allocation information in the PDCCH. However, DCI defined up to now can indicate all OFDM symbols rather than partial OFDM symbols. Therefore, even if the BS allocates the residual OFDM symbols to the UE, the UE cannot know the fact that it should use partial OFDM symbols and which partial OFDM symbols should be used thereby. Hence, additional information should be signaled to the UE so that the UE may use the residual OFDM symbols. The present invention proposes that the BS should transmit information indicating that the BS will perform PDSCH transmission to the UE that is to use the residual OFDM symbols using the residual OFDM symbols through higher layer (e.g. radio resource control (RRC) layer) signaling to the UE. That is, according to an embodiment of the present invention, a subframe in which the UE is to use the residual OFDM symbols and OFDM symbols to be used for DL data reception among OFDM symbols in the subframe are semi-statically configured.

The BS according to the present invention signals, to a specific UE, in which subframe only the residual OFDM symbols should be used or in which subframe all time-frequency resources allocated to the specific UE should be used. If the residual OFDM symbols are used for PDSCH transmission, the BS according to an embodiment of the present invention may signal the positions of the residual OFDM symbols and the number of the residual OFDM symbols using the following methods.

1. The BS may signal a symbol configuration for BS-to-RN transmission, which is signaled to an RN from the BS, to an MUE. The MUE may be aware of the number of symbols used for a PDCCH through a PCFICH. The MUE may know the positions and number of residual OFDM symbols in a subframe configured for RN transmission, using the number of the symbols for PDCCH transmission and the relay configuration received from the BS.

2. The BS may separately signal the number and positions of available OFDM symbols to the MUE. For example, the BS may indicate OFDM symbols, available for the UE, using a bitmap consisting of bits in a one-to-one correspondence to symbols in a subframe. According to the present invention, compared with the symbol configuration signaling method for BS-to-RN transmission, OFDM symbols, available for the MUE in a subframe for RN transmission, can be flexibly configured.

Hereinafter, embodiments of the present invention will be described by referring to a subframe in which the MUE should use the residual OFDM symbols and the number and positions of the residual OFDM symbols in the subframe as a residual OFDM symbol configuration. Upon receiving the residual OFDM symbol configuration from a BS, the MUE may be aware of which OFDM(s) are used for PDSCH transmission to the MUE in the subframe or which OFDM(s) are not used for PDSCH transmission in the subframe. Accordingly, the MUE may know that demodulation should be performed through rate matching or puncturing with respect to resources of OFDM symbols used for a relaying operation among OFDM symbols in the subframe.

Meanwhile, the BS may inform the UE through higher layer signaling of the residual OFDM symbol configuration information indicating a subframe in which the UE should use partial OFDM symbols rather than all OFDM symbols and indicating the partial OFDM symbol and inform the UE through lower layer (e.g. physical layer) signaling of information indicating that the residual OFDM symbol configuration is enabled or disabled. That is, enabling/disabling of the residual OFDM symbol configuration may be dynamically configured. The information about the enabling/disabling of the residual OFDM symbol configuration may be transmitted to the MUE by setting a prescribed indicator on the PDCCH for the MUE.

<RS for Using Residual OFDM Symbols>

To demodulate a signal transmitted between a BS and an RN/UE, a reference signal (RS) to be compared with a data signal is needed. The RS indicates a signal of a predefined special waveform, known to the BS and RN/UE, transmitted from the BS to the UE/RN or from the UE/RN to the BS and is referred to as a pilot signal. RSs may broadly be classified into dedicated RSs (DRSs) and common RSs (CRSs). The RSs may also be divided into RSs for demodulation and RSs for channel measurement. A CRS and a DRS are also referred to as a cell-specific RS and a demodulation RS (DMRS), respectively. The DMRS is also referred to as a UE-specific RS.

The CRS is an RS used for both demodulation and measurement and is shared by all UEs in a cell. In contrast, the DMRS is generally used for only demodulation and may be used by a specific-UE only.

Figure 8:
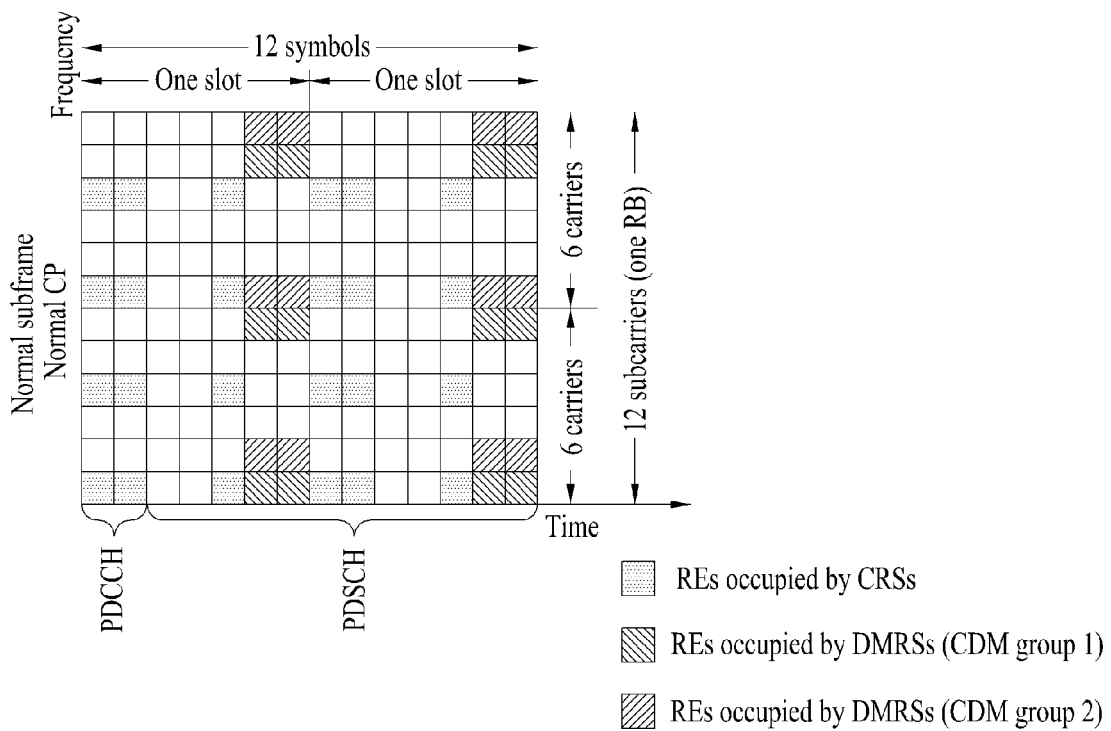
FIG. 8 illustrates CRS REs and DMRS REs in an RB pair of a normal subframe having a normal CP.

FIG. 8 illustrates CRS REs and DMRS REs in an RB pair of a normal subframe having a normal CP.

Referring to FIG. 8, if a BS transmits two layers, the BS may transmit two DMRSs for the two layers on REs belonging to code division multiplexing (CDM) group 1. If the BS transmits four layers, the BS may transmit two DMRSs for layers 1 and 2 on REs belonging to CDM group 1 and transmit two DMRSs for layers 3 and 4 on REs belonging to CDM group 2. If the BS transmits eight layers, the BS may transmit four DMRSs for four layers on REs belonging to CDM group 1 and transmit four DMRSs for four layers on REs belonging to CDM group 2. Meanwhile, the BS may transmit CRSs for channel measurement. Alternatively, for a UE configured to perform demodulation using CRSs rather than DMRSs, the BS may transmit the CRSs in a normal subframe.

1. CRS Based Demodulation

In case of CRS based DL transmission, the BS transmits a corresponding layer to the UE together with CRSs for layer demodulation and channel estimation between the BS and the UE. Since the CRSs are used for both a demodulation purpose and a measurement purpose, the CRSs are transmitted in all subframes supporting DL transmission.

Accordingly, RN backhaul transmission, i.e. BS-to-RN transmission, is performed based on the CRSs, the BS transmits the PDSCH to an RN together with the CRSs and, thus, an MUE using residual OFDM symbols may perform demodulation and channel measurement using the CRSs.

However, if a subframe in which RN backhaul transmission is configured is an MBSFN, a PDSCH region of the MBSFN subframe cannot include the CRSs and RN backhaul transmission based on the CRSs cannot be performed. Accordingly, if RN backhaul transmission is configured in the MBSFN subframe, the BS transmits a PDSCH to the RN together with DMRSs to which the same matrix as a precoding matrix applied to the PDSCH is applied. Meanwhile, according to the current 3GPP LTE(-A) standard, DMRSs for DL data cannot be transmitted on an RB in which the DL data is not transmitted. Since DL data for the MUE using the residual OFDM symbols is transmitted to the UE using only partial symbols in an RB, the DMRSs for the MUE cannot be transmitted, in principle, on frequency block(s) in which the BS configures a backhaul link. In this case, it is considered that the MUE using the residual OFDM symbols uses the DMRSs for the RN. However, a channel direction from the BS to the MUE and a beam direction to the RN are not matched and, thus, performance of PDSCH demodulation performed by the MUE may be degraded.

Therefore, if the PDSCH region of the MBSFN subframe does not include the CRSs but a PDCCH region, i.e. a control region, includes the CRSs, an embodiment of the present invention proposes that the MUE perform demodulation using CRSs in the PDCCH region rather than DMRSs in the PDSCH region.

2. DMRS Based Demodulation

Another embodiment of the present invention proposes that, if BS-to-RN transmission is performed in an MBSFN subframe, an MUE configured to use residual OFDM symbols receives a PDSCH for the MUE on the residual OFDM symbols in a frequency domain applied to the MUE but receives DMRSs for the PDSCH even in OFDM symbols other than the residual OFDM symbols, that is, even in OFDM symbols for a backhaul link, among OFDM symbols for the PDSCH region. That is, while the MUE to which the residual OFDM symbols have been allocated should not detect data in symbols other than the residual OFDM symbols among OFDM symbols for the backhaul link, the MUE may receive the DMRSs using even the OFDM symbols for backhaul link other than the residual OFDM symbols. The BS may transmit a PDSCH of a specific MUE on resources in the residual OFDM symbols to the specific MUE and transmit the DMRSs of the PDSCH on resources for BS-to-RN transmission to the specific MUE.

The DMRSs for a UE using the residual OFDM symbols may be transmitted to the UE using the following methods.

2-1. Equal DMRS Resource

When BS-to-RN transmission is performed in an MBSFN subframe, a BS multiplexes DMRSs for a PDSCH transmitted to an MUE in residual OFDM symbols with DMRS(s) for BS-to-RN transmission and transmits the multiplexed DMRS(s) on the same resource. The BS may scramble the DMRS(s) for the PDSCH for the MUE and the DMRS(s) for BS-to-RN transmission using different scrambling IDs (SC-IDs) and transmit the scrambled DMRSs. The BS may transmit an SCID for the MUE to the MUE through a PDCCH and an SCID for the RN to the RN through an R-PDCCH. The R-PDCCH refers to a set of time-frequency resources carrying control information provided by the BS to the RN. The RN and MUE may detect DMRS(s) thereof by demultiplexing or descrambling DL signals received in the DMRS resources using the corresponding scrambling IDs. Alternatively, the BS may transmit the DMRS(s) for the MUE and the DMRS(s) for the RN using different antenna ports. The MUE and RN may detect DMRS(s) transmitted through antenna ports allocated thereto as DMRSs thereof.

According to this embodiment, the MUE receives DMRS(s) for DL data in DMRS symbols of a subframe in which the MUE is assigned the DL data, irrespective of whether a subframe is a normal subframe or a subframe configured for RN transmission.

2-2. Different DMRS Resources

The BS may transmit DMRS(s) for BS-to-RN transmission, i.e. DMRS(s) for an RN, in the first slot of a subframe configured for RN transmission and transmit DMRS(s) for an MUE to which residual OFDM symbols are allocated in the second slot of the subframe. The DMRS(s) for the RN should be transmitted in the first slot because the last symbol of the subframe may not be used for BS-to-RN transmission according to a BS-to-RN symbol configuration in some cases. For example, according to configuration 0-1, 1-1, or 2-1 of FIG. 6, the last symbol cannot be used for BS-to-RN transmission. Since the last symbol corresponds to a residual OFDM symbol of the present invention, resources of the last symbol may be used to transmit data to the MUE. However, referring to FIG. 8, if the last symbol of the subframe cannot be used for BS-to-RN transmission, since DMRS(s) transmitted in the second slot are transmitted on REs of the last symbol, the RN cannot use the DMRS(s) located in the second slot. This is because the RN expects to receive DL signals only within a symbol duration defined according to a BS-to-RN symbol configuration in BS-to-RN transmission. Therefore, if the last symbol cannot be used for BS-to-RN transmission, the RN may demodulate DL data using only DMRS(s) located in the first slot. In this case, the RN may demodulate BS-to-RN transmission data using DMRS(s) received on DMRS REs in the first slot of the subframe and the MUE may demodulate data therefor using DMRS(s) received in DMRS REs in the second slot of the subframe.

Since the DMRS REs in the second slot are used for DMRS transmission for the MUE, the BS may not map the BS-to-RN transmission data onto the DMRS REs in the second slot in order to aid in channel estimation of the MUE. The BS may not transmit data on the DMRS REs in the second slot using rate matching or puncturing. The BS may inform the RN that the DMRS REs of the last symbol have been rate-matched or punctured through a higher layer signal or through a physical layer signal such as an R-PDCCH.

According to this embodiment, the MUE receives, in a normal subframe, DMRS(s) of corresponding DL data on DMRS symbols in the first and second slots of the normal subframe. However, in a specific subframe indicated by the BS, the MUE does not receive the DMRS(s) of the corresponding DL data in the DMRS symbols in the first slot of the specific subframe and receives the DMRS(s) of the corresponding DL data in the DMRS symbols in the second slot of the specific subframe.

<Transport Block Size Determination>

Data transmitted by the BS to the UE consists of one or more transport blocks. Each transport block is coded into one codeword and transmitted to the UE in one or more layer forms. A PDSCH may carry codewords of one or more predetermined numbers. The UE estimates the size of transport blocks transmitted by the BS to the UE using prescribed parameters. In this case, the UE considers the amount of time-frequency resources used for transmission of the transport blocks. According to the present invention, data for a specific UE is transmitted in a part of symbols rather than all symbols of a PDSCH region in a subframe. Therefore, an embodiment of the present invention proposes to exclude resources on symbols which are not used for data transmission of the specific UE from estimating a transport block size (TBS).

Figure 9:
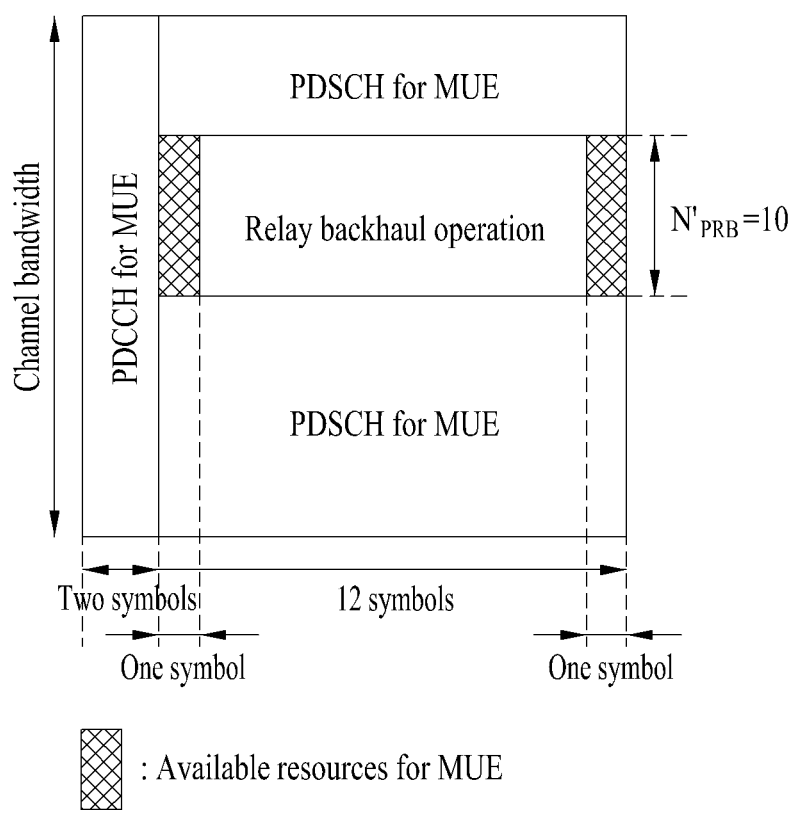
FIG. 9 explains a method for determining a TBS according to an embodiment of the present invention.

FIG. 9 is a view illustrated to explain a method for determining a TBS according to an embodiment of the present invention.

For example, according to 3GPP TS 36.213, the UE may estimate a TBS transmitted thereto using $I_{TBS}$ and $N_{PRB}$. Table 3 illustrates a portion of a TBS table.

TABLE 3

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| ... | ... | ... | ... | ... | ... | ... | ... | ... | ... | ... |
| 26 | 712 | 1480 | 2216 | 2984 | 3752 | 4392 | 5160 | 5992 | 6712 | 7480 |

TABLE 3-continued

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| ... | ... | ... | ... | ... | ... | ... | ... | ... | ... | ... |
| 26 | 8248 | 8760 | 9528 | 10296 | 11064 | 11832 | 12576 | 13536 | 14112 | 14688 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| ... | ... | ... | ... | ... | ... | ... | ... | ... | ... | ... |
| 26 | 15264 | 16416 | 16992 | 17568 | 18336 | 19080 | 19848 | 20616 | 21384 | 22152 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| | ... | ... | ... | ... | ... | ... | ... | ... | ... | ... |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| ... | ... | ... | ... | ... | ... | ... | ... | ... | ... | ... |
| 26 | 75376 | 75376 | 75376 | 75376 | 75376 | 75376 | 75376 | 75376 | 75376 | 75376 |

$I_{TBS}$ is a value determined using a combination of $I_{MCS}$ signaled through a DCI format with a modulation order. A method for determining $I_{TBS}$ is disclosed in detail in TS 36.213. The UE may determine $I_{TBS}$ using a combination of $I_{MCS}$ signaled through a DCI format with a modulation order and determine a TBS using the determined $I_{TBS}$ and $N_{PRB}$, which is the number of PRBs allocated to the UE. The UE may be aware of $N_{PRB}$ using RB allocation information transmitted to the UE through a PDCCH for the UE. Referring to Table 3, for example, if $I_{TBS}$=26 and $N_{PRB}$=27, the UE may determine a TBS to be 19848.

If the MUE uses the above-described residual OFDM symbols, resources of symbols on which a PDSCH is actually transmitted among all symbols which can be used for PDSCH transmission, that is, only resources on residual OFDM symbols should be considered for TBS determination. Accordingly, an embodiment of the present invention calculates valid $N_{PRB}$ using the ratio of the number of all available OFDM symbols for PDSCH transmission to the number of the residual OFDM symbols and uses the valid $N_{PRB}$ as a column indicator used for TBS determination. That is, according to this embodiment, $N_{PRB}$ is determined in consideration of the number of OFDM symbols which are actually used during PDSCH transmission to the MUE except for OFDM symbols used for a relay backhaul operation.

$N_{PRB}$ used as the column indicator of the TBS table, i.e. the valid $N_{PRB}$, may be determined, for example, as follows, in consideration of the number of allocated PRBs and the amount of resources for usage other than PDSCH transmission.

$$N_{PRB} = \max\left\{\left\lfloor N'_{PRB} \times \left(\frac{k}{N_{sym}}\right)\right\rfloor, 1\right\} \quad \text{[Equation 1]}$$

In Equation 1, $N_{PRB}$ denotes the number of valid PRBs, $N'_{PRB}$ denotes the number PRBs allocated to the UE, $N_{sym}$ denotes the number of OFDM symbols in a PDSCH region of one subframe, and k denotes the number of OFDM symbols available for the UE according to the present invention among $N_{sym}$ OFDMs.

Referring to FIG. 9, if 10 PRBs are allocated to the UE, $N'_{PRB}$ is 10. A subframe of FIG. 9 includes a total of 14 symbols and the first two symbols are for the purpose of PDCCH transmission. Accordingly, 12 symbols except for the two symbols correspond to a PDSCH region which can be used for PDSCH transmission and $N_{sym}$ is 12. If the BS allocates $N'_{PRB}$ PRBs to the RN and BS-to-RN transmission symbol configuration 2-1 is applied to the RN, the BS may allocate two symbols of both ends among the 12 symbols to the MUE. If the BS allocates the two right and left symbols among OFDM symbols for a relay backhaul operation to the UE, k equals to 2. Then, $N_{PRB}$=max{floor(10*(2/12)),1}=1. Referring to Table 3, the UE may determine one value corresponding to determined $I_{TBS}$ to be a TBS, among 27 values of the TBS in a column corresponding to $N_{PRB}$=1.

According to the present embodiment, the UE can accurately determine the TBS carried by a PDSCH even when the UE receives the PDSCH on partial OFDM symbol(s) rather than all OFDM symbols in the PDSCH region. According to the present embodiment, ambiguity between the BS and the UE, which may be generated when the UE receives the PDSCH on the partial OFDM symbols, can be eliminated.

The embodiments described in <frequency band restriction for MUE transmission>, <signaling indicating subframe configuration>, <RS for using residual OFDM symbols>, and <transport block size determination> may be independently used or two or more embodiments may be used together.

Figure 10:
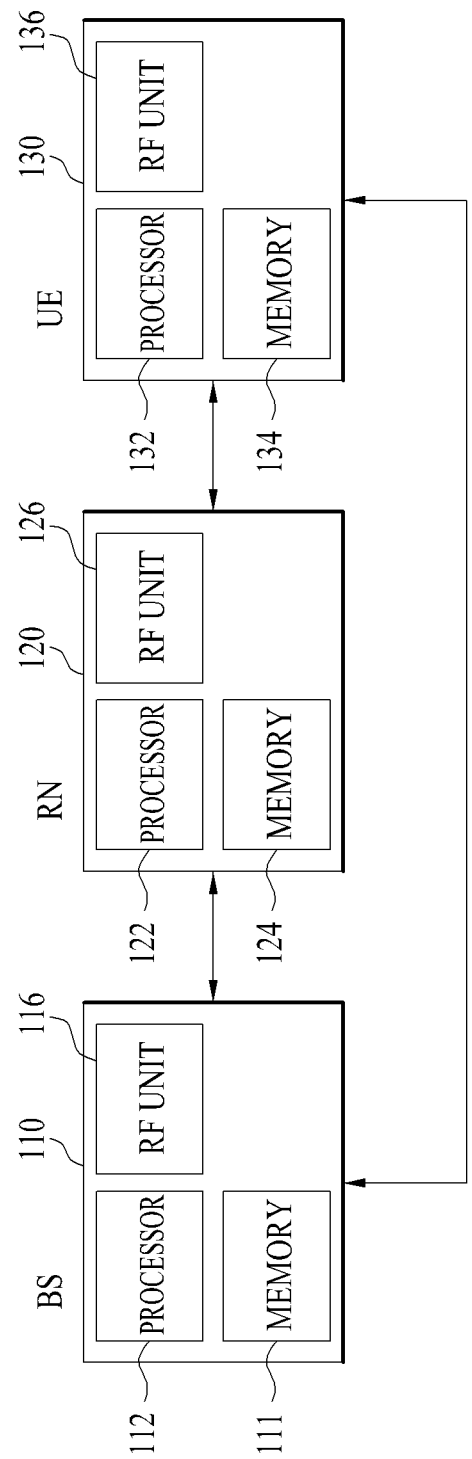
FIG. 10 illustrates a BS, an RN, and a UE implementing the present invention

FIG. 10 illustrates a BS, an RN, and a UE implementing the present invention.

A BS 110 includes a processor 112, a memory 114, and a radio frequency (RF) unit 116. The processor 112 may be configured to implement procedures and/or methods proposed in the present invention. The processor 112 may be configured to perform operations of the BS according to the above-described embodiments. For example, the processor 112 may be configured to configure a subframe for RN transmission, allocate residual OFDM symbols to a specific MUE, allocate frequency resources (e.g. PRB) to a specific MUE or an RN, and map data to data to REs, and/or map CRSs/DMRSs to CRS/DMRS REs. The memory 114 is connected to the processor 112 and stores various information related to the operation of the processor 112. The RF unit 116 is connected to the processor 112 and transmits and/or receives radio signals under control of the processor 112. The processor 112 may control the RF unit 116 to transmit DL signals to be transmitted to an RN 120 or a UE 130. The processor 112 may control the RF unit 116 to generate residual OFDM symbol configuration information and to generate the residual OFDM symbols. The processor 112 may control the RF unit 116 to transmit DMRSs for the RN 120 and/or DMRSs for the UE 130.

The RN 120 includes a processor 122, a memory 124, and an RF unit 126. The processor 122 may be configured to implement procedures and/or methods proposed in the present invention. The memory 124 is connected to the processor 122 and stores various information related to the operation of the processor 122. The RF unit 126 is connected to the processor 122 and transmits and/or receives radio signals to and/or from the BS 110 and/or the UE 130 under control of the processor 122. The RF unit 126 receives information about a subframe in which a relaying operation is configured and symbol configuration information for BS-to-RN transmission from the BS. The processor 122 may know in which subframe the RN should transmit/receive data based on the information about the subframe. In addition, the processor 122 may know, based on the configuration information, on which symbols among symbols in the subframe the relaying operation is performed. The processor 122 controls the RF unit 126 to receive data on symbols configured for BS-to-RN transmission in a subframe in which the relaying operation is allocated. The processor 122 controls the RF unit 126 to receive DMRSs allocated to the RN 120 and may demodulate data transmitted by the BS using the DMRSs.

The UE 130 includes a processor 132, a memory 134, and an RF unit 136. The processor 132 may be configured to implement procedures and/or methods proposed in the present invention. The memory 134 is connected to the processor 132 and stores various information related to the operation of the processor 132. The RF unit 136 is connected to the processor 132 and transmits and/or receives radio signals under control of the processor 112. The UE 130 may correspond to an MUE in the present invention. The processor 132 may be configured to perform operations of the MUE according to the above-described embodiments. The RF unit 136 may be configured to transmit various signals and/or information transmitted to the RN or MUE under control of the processor 132 according to the embodiments of the present invention. The processor 132 may control the RF unit 136 to receive DL signals using all OFDM symbols in a frequency domain allocated to the MUE in a normal subframe and control the RF unit 136 to receive DL data on specific OFDM symbol(s) indicated by the BS in a specific subframe indicated by the BS, according to the embodiment of the present invention. In addition, the processor 132 may control the RF unit 136 to receive/detect DMRSs transmitted for the MUE according to the embodiment of the present invention. The processor 132 may demodulate the DL data using the DMRSs transmitted for the MUE according to the embodiment of the present invention. In addition, the processor 132 may determine a TBS to be transmitted by the BS to the MUE according to the embodiment of the present invention.

The BS 110, the RN 120, and/or the UE 130 may include a single antenna or multiple antennas. Antennas may be referred to as antenna ports. Each antenna may correspond to one physical antenna or may be configured by a combination of more than one physical antenna element. A signal transmitted through each antenna cannot be decomposed by a receiver. An RS transmitted through a corresponding antenna defines an antenna viewed in terms of the receiver and enables the receiver to perform channel estimation upon the antenna, irrespective of whether a channel is a single radio channel transmitted from one physical channel or a composite channel transmitted from a plurality of physical antenna elements including the antenna. That is, an antenna is defined such that a channel for transmitting a symbol over the antenna can be derived from the channel through which another symbol on the same antenna is transmitted. In the case of the BS 110, the RN 120, and/or the UR 130 supporting a Multiple Input Multiple Output (MIMO) function of transmitting and receiving data using a plurality of antennas, they may be connected to two or more antennas.

According to the embodiments of the present invention, resources on residual OFDM symbols which have not been used for both the MUE and RN in a subframe in which a relay backhaul operation is configured can be used for signal transmission to the MUE.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to BSs, UEs, or other equipment in a wireless communication system.

The invention claimed is:

1. A method for receiving a downlink signal at a user equipment in a wireless communication system, the method comprising:

receiving information indicating a specific subframe and information indicating available symbols in the specific subframe from a base station;

receiving downlink control information for the use equipment from the base station in first symbols in a subframe; and receiving downlink data from the base station in symbols other than the first symbols in the subframe according to the downlink control information, wherein the specific subframe includes the first symbols used for the downlink control information for the user equipment, second symbols allocated to a relay node, and the available symbols used for the downlink data for the user equipment, wherein the downlink data is received only in the available symbols when the subframe is the specific subframe, and
wherein the available symbols are different from the first symbols and the second symbols.

2. The method according to claim 1, wherein the downlink data is received in the symbols other than the first symbols of the subframe when the subframe is not the specific subframe.

3. The method according to claim 2, further comprising:
receiving a demodulation reference signal for the downlink data in the subframe,
wherein the demodulation reference signal is received using a scrambling ID for the user equipment or is received in a second slot of first and second slots constituting the subframe, when the subframe is the specific subframe.

4. The method according to claim 1, further comprising:
determining a transport block size corresponding to the downlink data using the number of physical resource blocks, $N_{PRB}$, determined by the following equation, when the subframe corresponds to the specific subframe:

$$N_{PRB} = \max\{\text{floor}(N'_{PRB} * (k/N_{sym}), 1\}, \quad \text{<Equation>}$$

where $N'_{PRB}$ is the number of physical resource blocks allocated to the user equipment, $N_{sym}$ is the number of symbols other than the first symbols in the subframe, and k is the number of the available symbols.

5. A method for transmitting a downlink signal at a base station in a wireless communication system, the method comprising:
transmitting information indicating a specific subframe and information indicating available symbols in the specific subframe to a user equipment;
transmitting downlink control information to the user equipment in first symbols in a subframe; and
transmitting downlink data to the user equipment in symbols other than the first symbols in the subframe according to the downlink control information,
wherein the specific subframe includes the first symbols used for the downlink control information used for the downlink control information for the user equipment, second symbols allocated to a relay node, and the available symbols used for the downlink data for the user equipment,
wherein the downlink data is transmitted only in the available symbols to the user equipment when the subframe is the specific subframe, and
wherein the available symbols are different from the first symbols and the second symbols.

6. The method according to claim 5, wherein the downlink data is transmitted to the user equipment in the symbols other than the first symbols of the subframe when the subframe is not the specific subframe.

7. The method according to claim 5, further comprising:
transmitting a demodulation reference signal for the downlink data in the subframe to the user equipment,
wherein the demodulation reference signal is scrambled using a scrambling ID for the user equipment to be transmitted to the user equipment or the demodulation reference signal is transmitted to the user equipment in a second slot of first and second slots constituting the subframe, when the subframe is the specific subframe.

8. A user equipment for receiving a downlink signal in a wireless communication system, the user equipment comprising:

a radio frequency (RF) unit configured to transmit and receive radio signals; and
a processor configured to control the RF unit, wherein the processor is further configured to:
receive information indicating a specific subframe and information indicating available symbols in the specific subframe from a base station,
receive downlink control information for the user equipment from the base station in a first symbols in a subframe, and
receive downlink data from the base station in symbols other than the first symbols in the subframe according to the downlink control information,
wherein the specific subframe includes the first symbols used for the downlink control information for the user equipment, second symbols allocated to a relay node, and the available symbols used for the downlink data for the user equipment,
wherein the downlink data is received only in the available symbols when the subframe is the specific subframe, and
wherein the available symbols are different from the first symbols and the second symbols.

9. The user equipment according to claim 8, wherein the processor is further configured to receive the downlink data in the symbols other than the first symbols of the subframe when the subframe is not the specific subframe.

10. The user equipment according to claim 9, wherein the processor is further configured to receive a demodulation reference signal for the downlink data in the subframe using a scrambling ID for the user equipment or receive the demodulation reference signal in a second slot of first and second slots constituting the subframe, when the subframe is the specific subframe.

11. The user equipment according to claim 8, wherein the processor is further configured to determine a transport block size corresponding to the downlink data using the number of physical resources, $N_{PRB}$, determined by the following equation, when the subframe corresponds to the specific subframe:

$$N_{PRB} = \max\{\text{floor}(N'_{PRB} * (k/N_{sym}), 1\}, \quad \text{<Equation>}$$

where $N'_{PRB}$ is the number of physical resource blocks allocated to the user equipment, $N_{sym}$ is the number of symbols other than the first symbols in the subframe, and k is the number of the available symbols.

12. A base station for transmitting a downlink signal in a wireless communication system, the base station comprising:
a radio frequency (RF) unit configured to transmit and receive radio signals; and
a processor configured to control the RF unit, wherein the processor is further configured to:
transmit information indicating a specific subframe and information indicating available symbols in the specific subframe to a user equipment,
transmit downlink control information for the user equipment to the user equipment in a first symbols in a subframe, and
transmit downlink data to the user equipment in symbols other than the first symbols in the subframe according to the downlink control information,
wherein the specific subframe includes the first symbols used for the downlink control information for the user equipment, second symbols allocated to a relay node, and the available symbols used for the downlink data for the user equipment, wherein the downlink data to the user equipment is transmitted only in the available symbols when the subframe is the specific subframe, and wherein the available symbols are different from the first symbols and the second symbols.

13. The base station according to claim 12, wherein the processor is further configured to transmit the downlink data to the user equipment in the symbols other than the first symbols of the subframe when the subframe is not the specific subframe.

14. The base station according to claim 12, wherein the processor is further configured to transmit a demodulation reference signal for the downlink data in the subframe to the user equipment using a scrambling ID for the user equipment and transmit the scrambled demodulation reference signal to the user equipment or transmit the demodulation reference signal in a second slot of first and second slots constituting the subframe, when the subframe is the specific subframe.

* * * * *